March 2, 1937.  J. B. WHITBREAD  2,072,782
NIPPLE PIERCING MACHINE
Filed Oct. 31, 1935  2 Sheets-Sheet 1

INVENTOR.
James B. Whitbread
BY
ATTORNEYS

Patented Mar. 2, 1937

2,072,782

UNITED STATES PATENT OFFICE 2,072,782

NIPPLE PIERCING MACHINE

James B. Whitbread, Detroit, Mich., assignor to Cilocon Corporation, Detroit, Mich., a corporation of Michigan Application October 31, 1935, Serial No. 47,588

6 Claims. (Cl. 164—60)

This invention relates to piercing machines for the purpose of slitting articles to form valves and the like, and pertains more particularly to a machine for piercing rubber nipples for infants' feeding devices such as are disclosed in Patent No. 1,972,875.

The primary object of the invention is to provide a machine for piercing, to a predetermined depth, a wall formed of such material as rubber. The particular utility of the machine relates to the formation of valves such as disclosed in the above referred to prior patent. In such valves, which are formed as an integral part of a rubber feeding nipple, the wall of the nipple is provided with a dome shaped projection on the outer surface of the wall and the present machine cuts into the wall from the inner surface to provide a slit, not entirely through the wall at any point, but extending into the dome shaped projection. Further objects of the invention are to provide means for regulating the depth of the cut and to definitely position the cut with respect to the dome shaped projection to avoid completely severing the wall at any point. This latter feature is important inasmuch as the depth of the cut is greater than the normal wall thickness and it must be so disposed that it extends into the projection in order not to cut through the wall at any point.

With the above and other ends in view the invention is more fully disclosed with reference to the accompanying drawings, in which—

Figure 1:
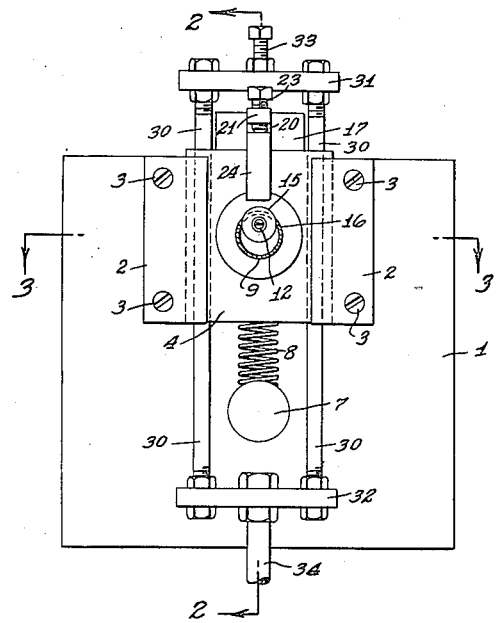

Figure 1 is a front elevation, with a part in cross section, and

Figure 3:
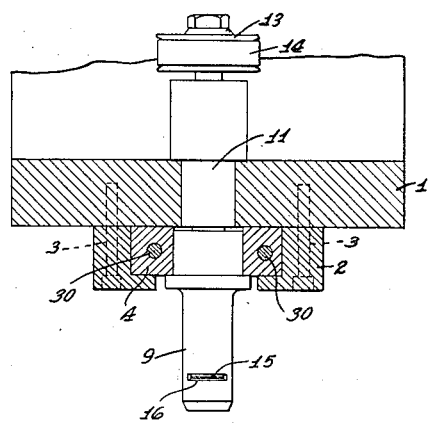
Figure 2:
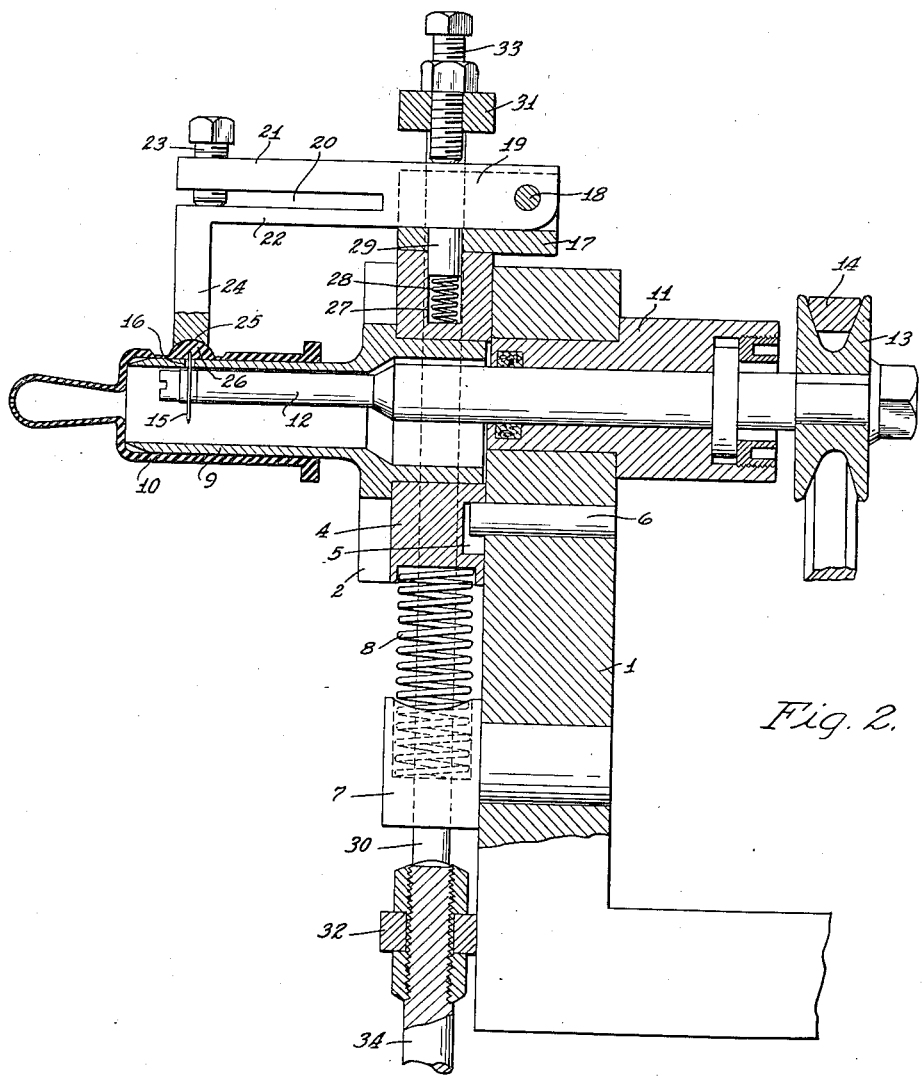

Figs. 2 and 3 are sections taken on lines 2—2 and 3—3 respectively of Fig. 1.

Like characters of reference are employed throughout to designate corresponding parts.

In the drawings the numeral 1 designates a vertically extending base member having guides 2 secured to the face thereof by bolts 3. Slidably received in the guides 2 is a plate 4 having a slot 5 into which a pin 6 projects. The pin 6 is stationary with respect to the base 1 and serves to limit movement of the plate 4 in the guides 2. Also mounted in the base 1 is a spring retainer 7 supporting a compressed coil spring 8 which engages the plate 4 to yieldably urge it upwardly and to normally hold it at the limit of its upward movement as defined by the pin 6. Carried by the plate 4 is a hollow work support 9 for receiving a rubber nipple 10 as shown in Fig. 2.

Rotatably journalled in a bearing 11 in the base 1 is a spindle 12 having a pulley 13 on its outer end thereof receiving a belt 14. The belt 14 is adapted to be driven by a suitable motor (not shown). The spindle 12 extends into the hollow work support 9 and has a circular cutter 15 thereon and disposed in line with a slot 16 in the work support.

Secured on top of the movable plate 4 is a bracket 17 carrying a pin 18 on which a lever 19 is fulcrumed. The lever 19 is forked, by forming a slot 20 therein, to provide two arms 21 and 22. The arm 21 carries a set screw 23 which engages the arm 22 and thus provides means whereby the two arms 21 and 22 may be flexed with respect to each other. The arm 22 further has a depending part 24 with a socket 25 in its lower extremity adapted to receive a dome shaped projection 26 on the nipple 10. The socket 25 is directly in line with the cutter 15 and serves to align the dome therewith as will be hereinafter more particularly described. In the plate 4 there is formed a bore 27 receiving a spring 28 and a plunger 29, the spring urging the plunger against the lever 19 to normally urge the latter to pivot around its fulcrum 18. Extending loosely through the plate 4 are two rods 30 which are connected at their upper ends by a cross beam 31 and at their lower end by a cross beam 32. In the cross beam 31 is mounted a set screw 33 adapted to bear against the lever 19 and a pull rod 34 is connected to the cross beam 32. The pull rod 34 is adapted to be connected to a manually movable lever or treadle (not shown) by means of which pressure may be applied thereto.

The normal inoperative position of the machine is the reverse to that shown in Fig. 2. In its inoperative position the spring 8 will hold the plate 4 at the limit of its upward movement and the spring 27 and plunger 28 will pivot the lever 19 to elevate the part 24 so that the nipple 10 may be placed on the work support 9. It will be assumed that the spindle 12 and cutter 15 are constantly rotating. After the nipple has been placed on the work support manual pressure is applied on the rod 34 and the rods 30 and cross beam 31 are pulled downwardly. As the cross beam 31 moves downwardly the set screw 33 strikes the lever 19 and pivots the same by overcoming the pressure of the spring 28. Pivotal movement of the lever moves the part 24 with the socket 25 toward the nipple and when the nipple is properly placed on the work support the dome shaped projection 26 will project into the socket 25. Continued pressure on the rod 34 causes the plate 4 to be moved downwardly and the work support, in moving with the plate 4, causes the cutter 15 to be gradually exposed through the slot 16 with the result that it pierces the wall of the nipple. The element 24 in pressing against the outside surface of the dome 26 holds the wall of the nipple so that the cutter must pierce the same as the work support is moved.

The set screw 33 provides a means for regulating the amount of pivotal movement of the lever 19 when the pressure is removed from the rod 34, this pivotal movement being necessary in order that the nipple may be placed on the work support without interference from the part 24. The set screw 23 serves as a means for adjusting the depth of the cut made by the cutter 15.

Although a specific embodiment of the invention has been shown and described it will be understood that various changes may be made within the scope of the appended claims without departing from the spirit of the invention, and such changes are contemplated.

What I claim is:—

1. In a machine of the character described, a hollow work support having a slot therein, a cutter rotatably supported within said work support, means for moving said work support to expose said cutter through said slot, and a backing member movable with said work support and adapted to engage the work as the latter is carried into engagement with the cutter.

2. In a machine of the character described, a hollow work support having a slot therein, a cutter rotatably supported within said work support, means for moving said work support to expose said cutter through said slot, a backing member movable with said work support and adapted to engage the work as the latter is carried into engagement with the cutter, and means for adjusting said backing member to regulate the depth of the cut made by said cutter.

3. In a machine of the character described, a base, a hollow work support having a slot therein, said work support being slidably supported by said base, a cutter rotatably supported by said base and normally disposed within said work support adjacent to said slot, and means for moving said work support slidably on said base whereby the cutting edge of said cutter is projected through said slot for engagement with work on said support.

4. In a machine of the character described, a base, a hollow work support having a slot therein, said work support being slidably mounted on said base, a cutter rotatably supported by said base within said hollow work support adjacent to the slot therein, resiliently yieldable means acting upon said support and normally positioning it whereby the cutter is disposed entirely within said work support whereby work may be placed thereon and removed therefrom, and means for moving said work support relative to said cutter whereby the cutting edge thereof is projected through said slot.

5. In a machine of the character described, a base, a hollow work support having a slot therein, said work support being slidably supported by said base, a cutter rotatably supported by said base and normally disposed within said work support adjacent to said slot, means for moving said work support slidably on said base whereby the cutting edge of said cutter is projected through said slot for engagement with work on said support, and work backing means, said work backing means comprising a movable element adapted to engage work carried by said support, resiliently yieldable means normally moving said work engaging element to a position spaced from said support whereby work may be placed thereon and removed therefrom, and means actuated by movement of said means for moving said work support for moving said work engaging element into engagement with work carried by said support prior to movement of said work support.

6. In a machine of the character described, a base, a hollow work support having a slot therein, said work support being slidably mounted on said base, a cutter rotatably supported by said base within said hollow work support adjacent to the slot therein, resiliently yieldable means acting upon said support and normally positioning it whereby the cutter is disposed entirely within said work support whereby work may be placed thereon and removed therefrom, means for moving said work support relative to said cutter whereby the cutting edge thereof is projected through said slot, and work backing means, said work backing means comprising a movable element adapted to engage work carried by said support, resiliently yieldable means normally moving said work engaging element to a position spaced from said support whereby work may be placed thereon and removed therefrom, and means actuated by movement of said means for moving said work support for moving said work engaging element into engagement with work carried by said support prior to movement of said work support.

JAMES B. WHITBREAD.